(12) United States Patent
Chung et al.

(10) Patent No.: US 8,784,769 B2
(45) Date of Patent: Jul. 22, 2014

(54) POLYELECTROLYTE MULTILAYER THIN FILM CATALYST AND METHOD FOR PRODUCING SAME

(75) Inventors: Young Min Chung, Daejeon (KR); Yong Tak Kwon, Daejeon (KR); Tae Jin Kim, Daejeon (KR); Seung Hoon Oh, Seoul (KR); Chang Soo Lee, Daejeon (KR); Bo Yeol Kim, Daejeon (KR)

(73) Assignee: SK Innovation Co., Ltd. (KR)

( * ) Notice: Subject to any disclaimer, the term of this patent is extended or adjusted under 35 U.S.C. 154(b) by 0 days.

(21) Appl. No.: 13/319,814

(22) PCT Filed: Apr. 7, 2010

(86) PCT No.: PCT/KR2010/002137
§ 371 (c)(1),
(2), (4) Date: Nov. 17, 2011

(87) PCT Pub. No.: WO2010/131839
PCT Pub. Date: Nov. 18, 2010

(65) Prior Publication Data
US 2012/0051999 A1 Mar. 1, 2012

(30) Foreign Application Priority Data

May 13, 2009 (KR) ........................ 10-2009-0041657

(51) Int. Cl.
| C01B 15/029 | (2006.01) |
| B01J 31/38 | (2006.01) |
| B01J 37/16 | (2006.01) |
| B01J 31/26 | (2006.01) |
| B01J 31/28 | (2006.01) |
| B82Y 30/00 | (2011.01) |
| B01J 31/06 | (2006.01) |
| H01B 1/12 | (2006.01) |
| B01J 37/02 | (2006.01) |
| B01J 31/10 | (2006.01) |
| B01J 23/70 | (2006.01) |
| B01J 35/00 | (2006.01) |
| B01J 23/50 | (2006.01) |
| B01J 23/44 | (2006.01) |
| B01J 23/74 | (2006.01) |
| B01J 23/40 | (2006.01) |

(52) U.S. Cl.
CPC ............... *B01J 23/44* (2013.01); *C01B 15/029* (2013.01); *B01J 37/0219* (2013.01); *B01J 31/10* (2013.01); *B01J 23/70* (2013.01); *B01J 37/0244* (2013.01); *B01J 35/0046* (2013.01); *B01J 23/50* (2013.01); *B01J 23/74* (2013.01); *B01J 23/40* (2013.01); *B01J 37/16* (2013.01); *Y10S 977/773* (2013.01)
USPC ........... 423/584; 502/159; 502/160; 977/773; 204/175; 588/320

(58) Field of Classification Search
None
See application file for complete search history.

(56) References Cited

U.S. PATENT DOCUMENTS

| 5,292,496 | A | 3/1994 | Nagashima et al. |
| 5,496,532 | A | 3/1996 | Monzen et al. |
| 6,168,775 | B1 | 1/2001 | Zhou et al. |
| 6,746,597 | B2 | 6/2004 | Zhou et al. |
| 6,822,103 | B2 | 11/2004 | Sanchez et al. |
| 6,958,138 | B1 | 10/2005 | Devic |
| 7,179,440 | B2 | 2/2007 | Escrig et al. |
| 2003/0086853 | A1 | 5/2003 | Devic |
| 2009/0291844 | A1* | 11/2009 | Hou et al. ..................... 502/160 |

FOREIGN PATENT DOCUMENTS

| JP | 57-139026 | 8/1982 |
| RU | 2001901 C1 | 5/1992 |
| RU | 2002726 C1 | 5/1992 |
| WO | 95/20559 | 8/1995 |
| WO | 97/33850 | 9/1997 |
| WO | 03/001575 A2 | 1/2003 |

OTHER PUBLICATIONS

Shen et al., Phys. Chem. Chem. Phys., 2008, 10, 3635-3644.*

Qingsheng Liu, et al., "*Supported Palladium Nanoparticles: An Efficient Catalyst for the Direct Formation of $H_2O_2$ from $H_2$ and $O_2$*," Angew. Chem. Int. Ed. 2008, 47, pp. 6221-6224.

V.R. Choudhary, et al., "*Direction Oxidation of $H_2$ to $H_2O_2$ over Pd-based Catalysts: Influence of Oxidation State, Support and Metal Additives*," Applied Catalysis A: General 308, 2006, pp. 128-133.

Jose M. Campos-Martin et al., "*Hydrogen Peroxide Synthesis: An Outlook beyond the Anthraquinone Process*," Angew. Chem. Int. Ed., 2006, 45, pp. 6962-6984.

Chanchal Samanta et al., "*Direct Oxidation of $H_2$ to $H_2O_2$ over $Pd/Ga_2O_3$ Catalyst under Ambient Conditions: Influence of Halide Ions Added to the Catalyst or Reaction Medium*," Applied Catalysis A: General 326, 2007, pp 28-36.

Qingsheng Liu, et al., "*Direct Synthesis of $H_2O_3$ from $H_2$ and $O_3$ over $Pd$-$Pt/SiO_2$ Bimetallic Catalysts in a $H_2SO_4$/Ethanol system*," Applied Catalysis A: General 339, 2008, pp. 130-136.

V.R. Choudhary, et al., "*Influence of Nature/Concentration of Halide Promoters and Oxidation State on the Direct Oxidation of $H_2$ to $H_2O_2$ over $Pd/ZrO2$ Catalysts in Aqueous Acidic Medium*," Catalysis Communications 8, 2007, pp. 1310-1316.

Gang Li, et al., "*Direct Synthesis of Hydrogen Peroxide from $H_2$ and $O_2$ and in situ Oxidation Using Zeolite-Supported Catalysts*," Catalysis Communications 8, 2007, pp. 247-250.

Chanchal Samanta, et al., "*Direct Synthesis of $H_2O_2$ and $H_2$ and $O_2$ over Pd/H-beta Catalyst in an Aqueous Acidic Medium: Influence of Halide Ions Present in the Catalyst or Reaction Medium on $H_2O_2$ Formation*," Catalysis Communications 8, 2007, pp. 73-79.

Yi-Fan Han, et al., "*A Comparison of Ethanol and Water as the Liquid Phase in the Direct Formation of $H_2O_2$ from $H_2$ and $O_2$ over a Palladium Catalyst*," Catalysis Letters vol. 99, Nos. 1-2, Jan. 2005, pp. 13-19.

Jennifer K. Edwards, et al., "*Comparison of Supports for the Direct Synthesis of Hydrogen Peroxide from $H_2$ and $O_2$ using Au-Pd Catalysts*," Catalysis Today 122, 2007, pp. 397-402.

Philip Landon, et al., "*Direct Formation of Hydrogen Peroxide from $H_2/O_2$ using a Gold Catalyst*," Chem. Commun., 2002, pp. 2058-2059.

Dhammike P. Dissanayake, et al., "*Evidence for the Role of Colloidal Palladium in the Catalytic Formation of $H_2O_2$ from $H_2O_2$*," Journal of Catalysis 206, 2002, pp. 173-176.

Dhammike, P. Dissanayake, et al., "*The Direct Formation of $H_2O_2$ from $H_2$ and $O_2$ over Colloidal Palladium*," Journal of Catalysis 214, 2003, pp. 113-120.

Yi-Fan Han, et al., "*Direct Formation of $H_2O_2$ from $H_2$ and $O_2$ over a $Pd/SiO_2$ Catalyst: The Roles of the Acid and the liquid Phase*," JOunral of Catalysis 230, 2005, pp. 313-316.

Jennifer K. Edwards, et al., "*Direct Synthesis of Hydrogen Peroxide from $H_2$ $O_2$ using $TiO_2$-supported Au-Pd Catalysts*," Journal of Catalysis 236, 2005, pp. 69-79.

Vasant R. Choudhary, et al., "*Role of Chloride or Bromide Anios and Protons for Promoting the Selective Oxidation of $H_2$ by $O_2$ to $H_2O_2$ over Supported Pd Catalysts in an Aqueous Medium*," Journal of Catalysis 238, 2006, pp. 28-38.

Vasant R. Choudhary, et al., "*Synergetic Effect of Two Halogen Promoters Present in Acidic Reaction Medium or Catalyst on the $H_2O_2$ formation (in $H_2$-to-$H_2O_2$ Oxidation) and Destruction over Pd/C (or $Al_2O_3$) Catalyst*," Journal of Catalysis 246, 2007, pp. 434-439.

Philip Landon, et al., "*Direct Synthesis of Hydrogen Peroxide from $H_2$ and $O_2$ using pd and Au Catalysts*," Phys.Chem. Chem. Phys., 2003, 5, pp. 1917-1923.

Jennifer K. Edwards, et al., "*Switching Off Hydrogen Peroxide Hydrogenation in the Direct Synthesis Process*," Science 323, 1037, 2009, pp. 1037-1041.

Kidambi, et al., "*Selective Hydrogenation by Pd Nanoparticles Embedded in Polyelectrolyte Multilayers*," J. Am. Chem. Soc., 2004, 126, pp. 2658-2659.

Kidambi, et al., "*Multilayered Polyelectrolyte Films Containing Palladium Nanoparticles: Synthesis, Characterization, and Application in Selective Hydrogenation*," Chem. Mater. 2005, 17, pp. 301-307.

Advincula, Rigoberto C., "*Polyelectrolytes and Nanoparticles: Synthesis and Mediation*," ACS-PRF Summer School on Nanoparticles, 2004.

\* cited by examiner

*Primary Examiner* — Yun Qian

(74) *Attorney, Agent, or Firm* — DLA Piper LLP (US)

(57) ABSTRACT

Disclosed herein is a catalyst, including, in one example: a carrier, a polymer electrolyte multilayer film formed on the carrier, and metal particles dispersed in the polymer electrolyte multilayer film. The catalyst can be easily prepared, and can be used to produce hydrogen peroxide in high yield in the presence of a reaction solvent including no acid promoter.

4 Claims, 4 Drawing Sheets

POLYELECTROLYTE MULTILAYER THIN FILM CATALYST AND METHOD FOR PRODUCING SAME

RELATED APPLICATIONS

This is a §371 of International Application No. PCT/KR2010/002137, with an international filing date of Apr. 7, 2010 (WO 2010/131839, published Nov. 18, 2010), which is based on Korean Patent Application No. 10 2009 004 1657, filed May 13, 2009, the subject matter of which is incorporated by reference.

TECHNICAL FIELD

The present disclosure relates to a catalyst comprising a polymer electrolyte multilayer film containing metal particles on a carrier, a method of preparing the catalyst, and a method of directly producing hydrogen peroxide from oxygen and hydrogen using the catalyst.

BACKGROUND

Currently, 95% or more of the total supply of hydrogen peroxide is produced by an anthraquinone process. However, this anthraquinone process requires a procedure for regenerating an anthraquinone solution and a procedure for separating hydrogen peroxide from an anthraquinone solution and refining the separated hydrogen peroxide because many reaction steps are required to produce hydrogen peroxide and side products are formed in side reactions of the reaction steps [J. M. Campos-Martin, G. Blanco-Brieva, J. L. G. Fierro, Angew. Chem. Int. Ed., vol. 45, page 6962 (2006)]. Therefore, the production of hydrogen peroxide using an anthraquinone process has high energy consumption and high production costs, thus causing the price competitiveness of hydrogen peroxide to be decreased.

In order to solve the problems of an anthraquinone process, research into reactions for directly producing hydrogen peroxide from oxygen and hydrogen that do not produce side products other than water has been being made for a long period of time, but this research is not commercially available yet due to technical difficulties. This research is problematic as follows.

First, there is a problem with mixing oxygen and hydrogen. That is, a mixture of oxygen and hydrogen can very easily explode because it has a large explosive range depending on the mixing ratio of oxygen and hydrogen. When the concentration of hydrogen in air at a pressure of 1 atm is 4~75 mol %, the mixture can be exploded by an ignition source. Here, when oxygen is used instead of air, the explodable concentration of hydrogen is enlarged to 4~94 mol %. This explodable concentration of hydrogen is enlarged depending on the increase of pressure, thus increasing the explodability of the mixture [C. Samanta, V. R. Choudhary, Catal. Commun., vol. 8, page 73 (2007)]. Therefore, in the process of directly producing hydrogen peroxide using hydrogen and oxygen as reactants, the mixing ratio of hydrogen and oxygen is controlled within a safe range, and the concentration of hydrogen and oxygen is diluted with an inert gas such as nitrogen or carbon dioxide.

In addition to the above safety problem, there is another problem, which is that hydrogen peroxide, although produced, easily decomposes into water and oxygen because it is a very unstable compound, and it is not easy to acquire high hydrogen peroxide selectivity because a catalyst used to produce hydrogen peroxide is used to synthesize water. Therefore, in conducting research into reactions for directly producing hydrogen peroxide from oxygen and hydrogen, strong acids and halide additives together with high-activity catalysts have been researched in order to solve the above problems.

Reactions for directly producing hydrogen peroxide have been conducted using precious metal catalysts, such as gold, platinum, palladium and the like [P. Landon, P. J. Collier, A. J. Papworth, C. J. Kiely, G. J. Hutchings, Chem. Commun., page 2058 (2002); G. Li, J. Edwards, A. F. Carley, G. J. Hutchings, Catal. Commun., vol. 8, page 247 (2007); D. P. Dissanayake, J. H. Lunsford, J. Catal., vol. 206, page 173 (2002); D. P. Dissanayake, J. H. Lunsford, J. Catal., vol. 214, page 113 (2003); P. Landon, P. J. Collier, A. F. Carley, D. Chadwick, A. J. Papworth, A. Burrows, C. J. Kiely, G. J. Hutchings, Phys. Chem. Chem. Phys., vol. 5, page 1917 (2003); J. K. Edwards, B. E. Solsona, P. Landon, A. F. Carley, A. Herzing, C. J. Kiely, G. J. Hutchings, J. Catal., vol. 236, page 69 (2005); J. K. Edwards, A. Thomas, B. E. Solsona, P. Landon, A. F. Carley, G. J. Hutchings, Catal. Today, vol. 122, page 397 (2007); Q. Liu, J. C. Bauer, R. E. Schaak, J. H. Lunsford, Appl. Catal. A, vol. 339, page 130 (2008)]. Among the precious metal catalysts, the palladium catalyst is reported to exhibit relatively excellent activity, and this palladium catalyst is generally used in a state in which it is supported on a carrier, such as alumina, silica, carbon or the like.

Further, in order to improve the selectivity of hydrogen peroxide, acid is added to a solvent to prevent hydrogen peroxide from decomposing into water and oxygen, and halogen ions are added to a solvent or a catalyst to prevent oxygen and hydrogen from forming water [Y.-F. Han, J. H. Lunsford, Catal. Lett., vol. 99, page 13 (2005); Y.-F. Han, J. H. Lunsford, J. Catal., vol. 230, page 313 (2005); V. R. Choudhary, C. Samanta, J. Catal., vol. 238, page 28 (2006); V. R. Choudhary, P. Jana, J. Catal., vol. 246, page 434 (2007); C. Samanta, V. R. Choudhary, Catal. Commun., vol. 8, page 73 (2007); C. Samanta, V. R. Choudhary, Appl. Catal. A, vol. 326, page 28 (2007); V. R. Choudhary, C. Samanta, T. V. Choudhary, Catal. Commun., vol. 8, page 1310 (2007)]. Such additives, such as acid and halogen ions, serve to improve the selectivity of hydrogen peroxide, but cause the problems of corrosion, of elution of a metal, such as palladium or the like, supported on a carrier, thus decreasing catalytic activity; and, of requiring that hydrogen peroxide be separated and refined even after it is produced. Meanwhile, P. F. Escrig et al. reported that, when a palladium catalyst containing an ion exchange resin having a sulfonic acid group and a complex is used, high catalytic activity is exhibited even when only a very small amount of halogen ions is added without the addition of acid (U.S. Pat. Nos. 6,822,103 and 7,179,440).

Recently, various methods using nanotechnologies have been attempted in order to develop a high-activity catalyst which can be efficiently used to directly produce hydrogen peroxide from oxygen and hydrogen. For example, Q. Liu et al. developed a catalyst in which palladium nanoparticles are supported on active carbon (Q. Liu, J. C. Bauer, R. E. Schaak, J. H. Lunsford, Angew. Chem. Int. Ed., vol. 47, page 6221 (2008)), B. Zhou et al. insisted that nanoparticles phase-controlled by 110 plane exhibit excellent activity (U.S. Pat. Nos. 6,168,775 and 6,746,597), and J. K. Edwards reported that a catalyst in which a palladium-gold binary metal is supported on active carbon treated with nitric acid exhibits excellent hydrogen selectivity (J. K. Edwards, B. Solsona, D. Ntainjua, A. F. Carley, A. A. Herzing, C. J. Kiely, G. J. Hutchings, Science, vol. 323, page 1037 (2009)). However, in order to use the highly-dispersed nanoparticles as a catalyst, many technical difficulties, such as mass production, the prevention of metal elution, the prevention of sintering phenomenon in reaction, and the change in catalytic activity according to the phase transition of metal catalyst particles, must be overcome.

As described above, the method of directly producing hydrogen peroxide from oxygen and hydrogen has been researched for a long period of time due to its technical importance, but is still being researched academically and is limited to research into small-scale catalyst production and catalytic reaction. Therefore, in order to commercialize this method, it is keenly required to develop a catalyst which can be easily produced and which can exhibit remarkably excellent performance even under the reaction condition that additives, such as acids, halogen ions and the like, are used at a minimum.

SUMMARY

Hereupon, the present inventors have made efforts to develop a catalyst which can be produced and which can exhibit high activity in the production of hydrogen peroxide. As a result, they found that a catalyst in which a polymer electrolyte multilayer film containing metal particles is formed on a carrier can be used to obtain a high yield of hydrogen peroxide compared to conventional catalysts and that this catalyst exhibits high activity even under the condition that only a very small amount of halogen ions is added without the addition of acids. Based on the findings, the present disclosure was completed.

Accordingly, the present disclosure provides a catalyst which can exhibit high activity in various reactions.

Further, the present disclosure provides a method of forming a polymer electrolyte multilayer film containing metal particles on a carrier.

Furthermore, the present disclosure provides a method of directly producing hydrogen peroxide from oxygen and hydrogen using the catalyst.

An aspect of the present disclosure provides a catalyst, including: a carrier; a polymer electrolyte multilayer film formed on the carrier; and metal particles dispersed in the polymer electrolyte multilayer film.

Another aspect of the present disclosure provides a method of preparing a catalyst, including: forming a polymer electrolyte multilayer film on a carrier; dispersing metal precursors in the polymer electrolyte multilayer film; and reducing the metal precursors to metals using a reducing agent.

Still another aspect of the present disclosure provides a method of preparing a catalyst, including: forming a polymer electrolyte multilayer film complexed with metal precursors on a carrier; and reducing the metal precursors to metal particles using a reducing agent.

Still another aspect of the present disclosure provides a method of producing hydrogen peroxide from hydrogen and oxygen using the catalyst.

As described above, the catalyst according to the present disclosure discloses that metal particles are strongly bonded between the layers of a polymer electrolyte multilayer film, so that the elution of metal does not occur during a reaction, with the result that the activity of the catalyst does not deteriorate. Further, the catalyst according to the present disclosure discloses that the kind and pH of polymer electrolytes and the layer number of the polymer electrolyte multilayer film are adjusted, thus adjusting the concentration and particle size of the metal dispersed in the polymer electrolyte multilayer film. Furthermore, the catalyst according to the present disclosure discloses that it can be easily prepared, and in that it can be used to increase activity in various reactions using metal particles as a catalyst as well as to produce hydrogen peroxide.

DETAILED DESCRIPTION

Figure 1:
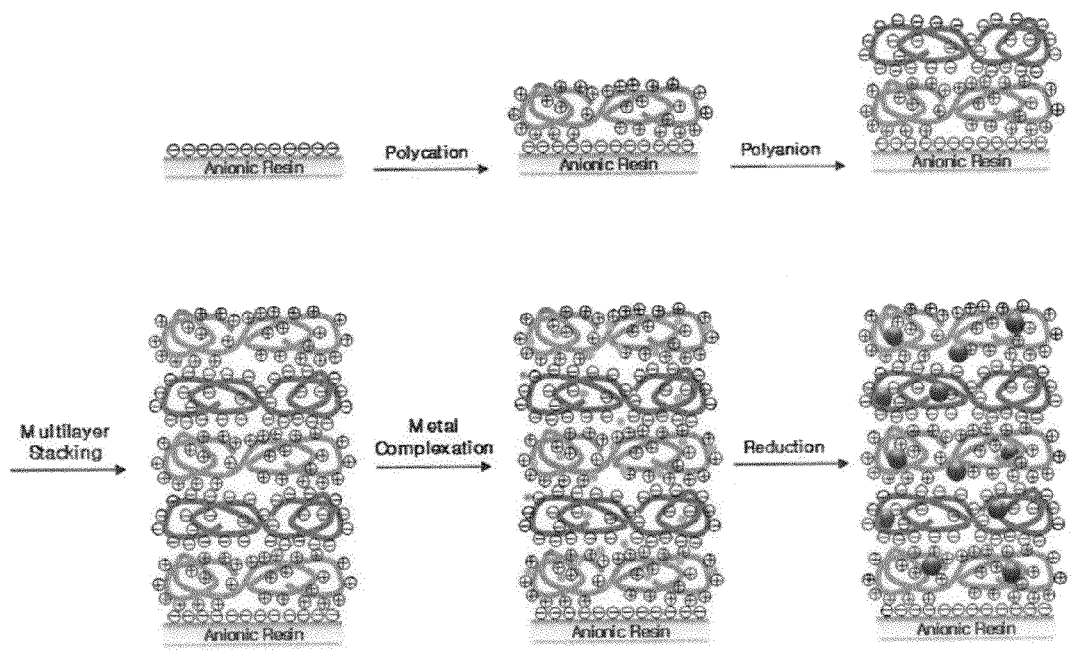
FIG. 1 is a schematic view showing a method of preparing a catalyst by sequentially and alternately stacking cationic polymer electrolytes and anionic polymer electrolytes on an anionic carrier to form a polymer electrolyte multilayer film, mixing the polymer electrolyte multilayer film with a metal precursor solution to form metal ions and then reducing the metal ions to metals.
Figure 2:
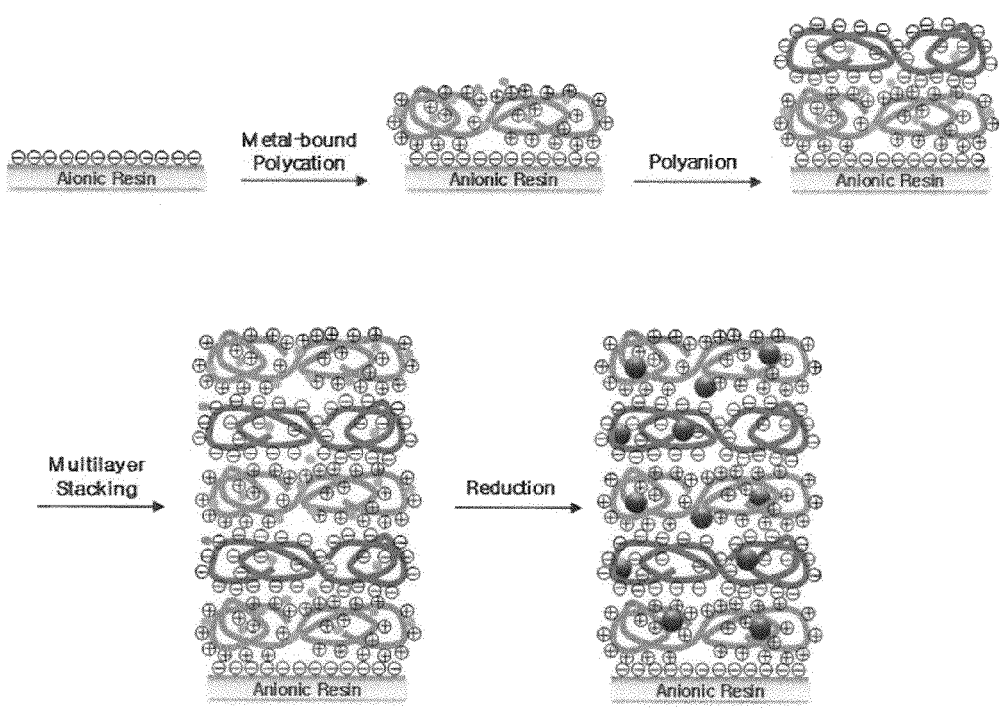
FIG. 2 is a schematic view showing a method of preparing a catalyst by sequentially and alternately stacking cationic polymer electrolytes and anionic polymer electrolytes complexed with metal precursors on an anionic carrier to form a polymer electrolyte multilayer film and then reducing metal ions to metals.
Figure 3:
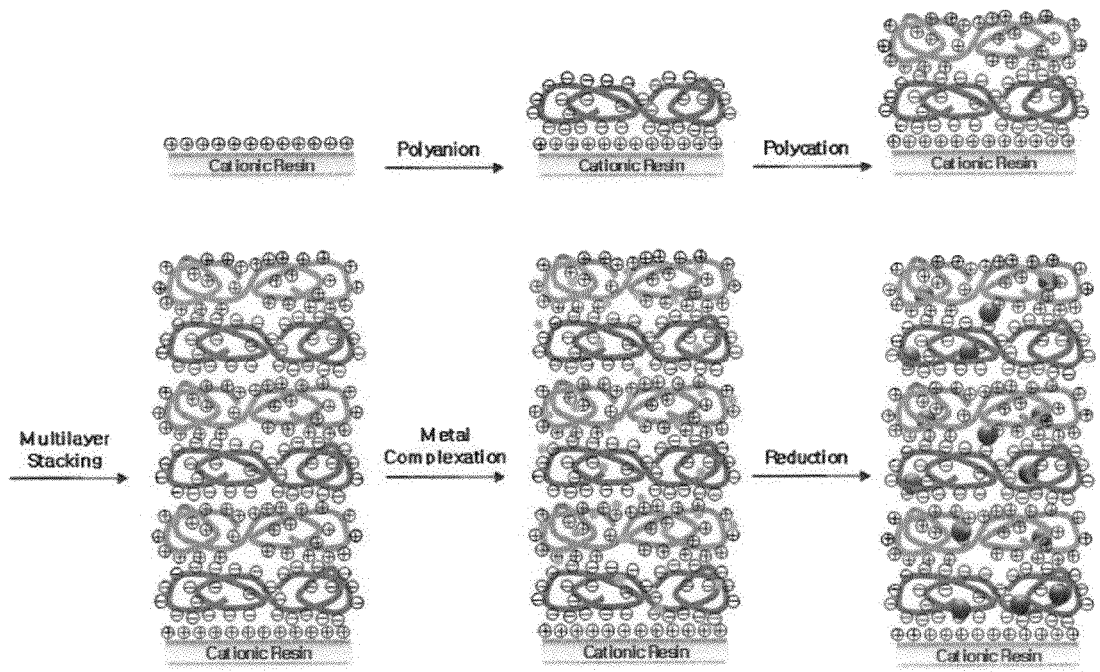
FIG. 3 is a schematic view showing a method of preparing a catalyst by sequentially and alternately stacking cationic polymer electrolytes and anionic polymer electrolytes on a cationic carrier to form a polymer electrolyte multilayer film, mixing the polymer electrolyte multilayer film with a metal precursor solution to form metal ions and then reducing the metal ions to metals.
Figure 4:
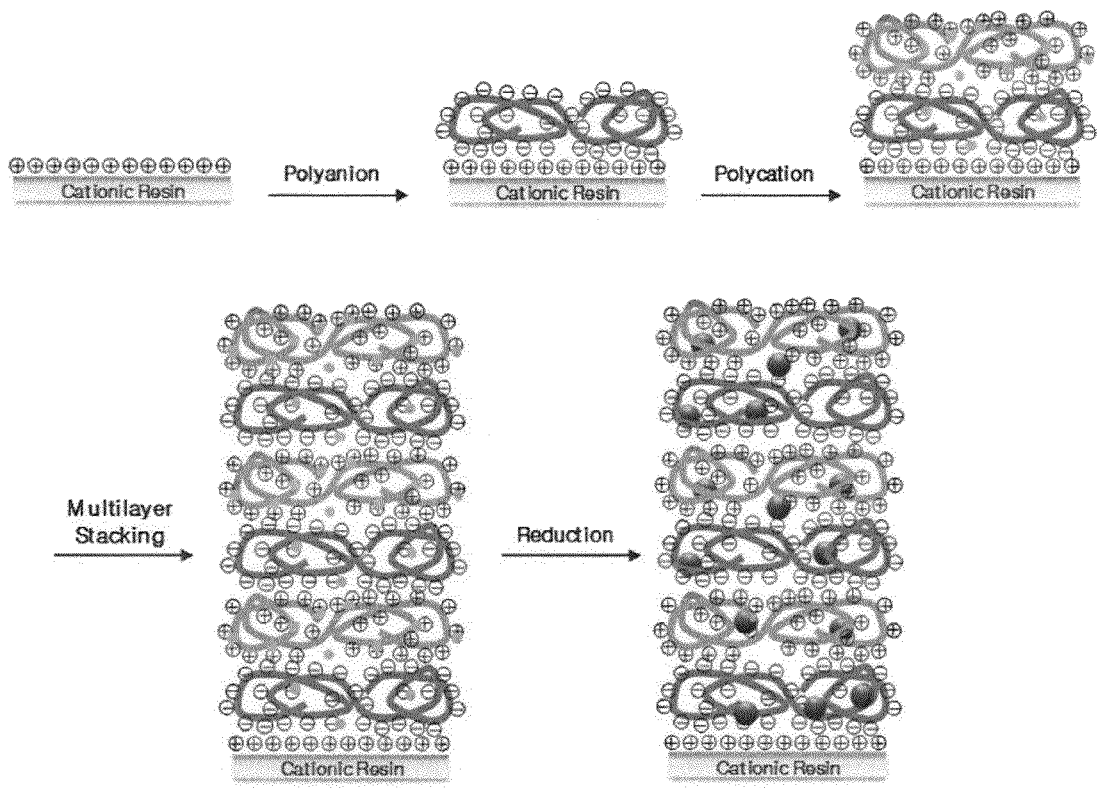
FIG. 4 is a schematic view showing a method of preparing a catalyst by sequentially and alternately stacking anionic polymer electrolytes and cationic polymer electrolytes complexed with metal precursors on a cationic carrier to form a polymer electrolyte multilayer film and then reducing metal ions to metals.

Hereinafter, exemplary embodiments of the present disclosure will be described in detail with reference to the attached drawings.

An embodiment of the present disclosure provides a catalyst, including: a carrier; a polymer electrolyte multilayer film formed on the carrier; and metal particles dispersed in the polymer electrolyte multilayer film.

The carrier may be electrically charged such that cationic or anionic polymer electrolytes are easily anchored thereon. Therefore, the carrier may be a cationic resin or an anionic resin.

As the anionic resin used as the carrier, a polymer resin having a anionic functional group selected from the group consisting of a sulfonic acid group, a carboxylic acid group, a phosphoric acid group and a phosphonic acid group may be used. The polymer resin having the cationic functional group may include one or more selected from among polybenzimidazole, polyimide, polyetherimide, polyphenylene sulfide, polysulfone, polyether sulfone, polyether ketones, polyetherether ketones, polyphenyl quinoxaline and fluorine polymer, and, preferably, may include one or more selected from among poly(perfluorosulfonic acid) (commercially supplied as "Nafion"), poly(perfluorocarboxylic acid), a sulfonic acid group-containing copolymer of tetrafluoroethylene and fluorovinylether, defluorinated polyetherketone sulfide, aryl ketones, poly[2,2'-(m-phenylene)-5,5'-bibenzimidazole], and poly(2,5-benzimidazole).

The cationic resin used as the carrier may be selected from among halogen compound resins, bicarbonate resins, carbonate resins, hydroxide resin, and mixtures thereof. Examples of the halogen compound resins are described in JP-A-57-139026 (cited as a reference). Examples of the bicarbonate resins are described in WO 95-20559, WO 97-33850, RU Pat. Nos. 2002726 and 2001901 (cited as references). Examples of commercially-available anionic resins may include Amberlite™ IRA 400 and 900 (polystyrene resin crosslinked with divinyl benzene, manufactured by Rohm and Haas), Lewatit™ M 500 WS (manufactured by Bayer), Duolite™ A 368, A-101D, ES-131 and A-161 (manufactured by Rohm and Haas), and DOWEX™ MSA-1, MARATHON A and MARATHON MSA (manufactured by Dow Chemical company), and the like.

In the present disclosure, a nonionic carrier may be used in addition to the ionic carrier. The kind of the nonionic carrier is not limited as long as electrically-charged polymer electrolytes can be formed thereon. Examples of the nonionic carrier may include active carbon, silica, alumina, silica-alumina, zeolite and other materials well known in the related field, preferably, alumina. This nonionic carrier is generally used in the art because it is cheaper than the ionic carrier. Therefore, in the present disclosure, the nonionic carrier, such as alumina, may be used for purposes of cost reduction although its efficiency is equal to or lower than that of the ionic carrier.

The polymer electrolyte anchored on the carrier includes a cationic polymer electrolyte and an anionic polymer electrolyte. The cationic electrolyte may be at least one selected from the group consisting of poly(allylamine), polydiallyldimethylammonium, poly(ethylenediamine) and poly(acrylamide-co-diallyldimethylammonium), but is not limited thereto. Further, the anionic electrolyte may be at least one selected from the group consisting of poly(4-styrenesulfonate), poly(acrylic acid), poly(acrylamide), poly(vinylphosphonic acid), poly(2-acrylamido-2-methyl-11-propanesulfonic acid), poly(anethole sulfonic acid) and poly(vinylsulfonate), but is not limited thereto. A variety of polymer electrolytes, such as the cationic polymer electrolytes and the anionic polymer electrolytes, are used, so that the ion bonding strength of the polymer electrolyte can be adjusted, with the result that metal particle size can be adjusted when metal precursors are reduced using a reducing agent.

In the present disclosure, when a polymer electrolyte multilayer film is formed using a polymer electrolyte, the thickness of the polymer electrolyte multilayer film is controlled by adjusting the molecular weight of the polymer electrolyte, thus controlling the concentration and particle size of the metal dispersed in the polymer electrolyte multilayer film. In this case, the polymer electrolyte may have a molecular weight of 1,000~1,000,000, preferably, 2,000~500,000. For example, PAH (poly(allylamine)hydrochloride) may have a molecular weight of 3,000~20,000, preferably, 4,000~12,000.

The polymer electrolyte multilayer film of the present disclosure has a layer number of 2~30, preferably, 2~15. The catalyst of the present disclosure is characterized by the fact that metal particles are not disposed on the surface of a carrier but between polymer electrolytes. For this reason, the catalyst including the polymer electrolyte multilayer film has more excellent activity than a catalyst including a polymer electrolyte monolayer film. Therefore, when the layer number of a polymer electrolyte multilayer film is less than 2, the polymer electrolyte multilayer film of the present disclosure cannot be formed. Further, when the layer number thereof is more than 30, the activity of the catalyst is not greatly changed, and thus it is unnecessary to form a polymer electrolyte multilayer having a layer number of greater than 30.

The metal particles dispersed within the polymer electrolyte multilayer film are selected from among palladium (Pd), platinum (Pt), ruthenium (Ru), rhodium (Rh), iridium (Ir), silver (Ag), osmium (Os), nickel (Ni), copper (Cu), cobalt (Co), titanium (Ti) and mixtures thereof, preferably, palladium (Pd), platinum (Pt) and a mixture thereof. These metal particles are formed by dispersing metal precursors within polymer electrolytes and then reducing the dispersed metal precursors using a reducing agent. Examples of the palladium-containing metal precursors used in the present disclosure containing palladium (Pd) include, but are not limited to, tetrachloroplatinic acid(II) ($H_2PtCl_4$), hexachloroplatinic acid(IV) ($H_2PtCl_6$), potassium tetrachloroplatinate(II) ($K_2PtCl_4$), potassium hexachloroplatinate(IV) ($H_2PtCl_6$), and mixtures thereof.

Further, the metal particles of the present disclosure, which can be variously adjusted according to the purpose of use, may have an average particle size of 1~1,000 nm, preferably 1~500 nm, and more preferably 1~100 nm.

Another embodiment of the present disclosure provides a method of preparing a catalyst, including the steps of: (a) alternately applying a first polymer electrolyte solution and a second polymer electrolyte solution to a carrier to form a polymer electrolyte multilayer film on the carrier, wherein the first polymer electrolyte solution and the second polymer electrolyte solution are different from each other, and are cationic or anionic electrolyte solutions, respectively; (b) applying a metal precursor solution to the carrier including the polymer electrolyte multilayer film formed thereon to disperse metal precursors in the polymer electrolyte multilayer film; and (c) reducing the metal precursors dispersed in the polymer electrolyte multilayer film to metals using a reducing agent.

This method of preparing a catalyst can be performed in various manners according to the kind of the electric charge of the carrier and the order of the polymer electrolyte solutions. Examples of the various manners are as follows.

In the first manner, the catalyst is prepared by a process of forming a polymer electrolyte multilayer film containing metal particles on a carrier, including the steps of: (a) applying a cationic polymer electrolyte on an anionic resin having a sulfonic acid group ($SO_3^-$) using distilled water as a solvent to form a cationic polymer electrolyte layer; (b) applying an anionic polymer electrolyte on the cationic polymer electrolyte layer to form an anionic polymer electrolyte layer; (c) repeatedly laminating the cationic polymer electrolyte layer and the anionic polymer electrolyte layer to form a polymer electrolyte multilayer film; (d) immersing the polymer electrolyte multilayer film into a metal precursor solution to disperse metal ions in the polymer electrolyte multilayer film; and (e) reducing the metal ions dispersed in the polymer electrolyte multilayer film to metals using a reducing agent.

In the second manner, the catalyst is prepared by a process of forming a polymer electrolyte multilayer film containing metal particles on a carrier, including the steps of (a) applying an anionic polymer electrolyte on a halogen-containing cationic resin ($NR_3^+Cl^-$) using distilled water as a solvent to form an anionic polymer electrolyte layer; (b) applying a cationic polymer electrolyte on the anionic polymer electrolyte layer to form a cationic polymer electrolyte layer; (c) repeatedly laminating the anionic polymer electrolyte layer and the cationic polymer electrolyte layer to form a polymer electrolyte multilayer film; (d) immersing the polymer electrolyte multilayer film into a metal precursor solution to disperse metal ions in the polymer electrolyte multilayer film; and (e) reducing the metal ions dispersed in the polymer electrolyte multilayer film to metals using a reducing agent.

In the method of preparing a catalyst according to the present disclosure, examples of the solvent for dissolving the polymer electrolyte may include water, n-hexane, ethanol, triethylamine, tetrahydrofuran (THF), dimethyl sulfoxide (DMSO), ethyl acetate, isopropyl alcohol, acetone, acetonitrile, benzene, butyl alcohol, chloroform, diethyl ether, and mixtures thereof.

Further, in the method of preparing a catalyst according to the present disclosure, the cationic or anionic polymer electrolyte solution may have a pH of 8~11, preferably 8~10, and the metal precursor solution may have a pH of 2~6, preferably 4~6, more preferably 2~4. When the pH of the cationic polymer electrolyte solution or the anionic polymer electrolyte solution is adjusted, the thickness of the polymer electrolyte multilayer film can be adjusted, thereby adjusting the concentration and particle size of the metals dispersed in the polymer electrolyte multilayer film.

Further, in the method of preparing a catalyst according to the present disclosure, in addition to a metal precursor dissolved in a general solvent such as distilled water or the like, a metal precursor dissolved in a solution whose pH is adjusted by the addition of acid or base may be used as the metal precursor used in this method. The two metal precursors may be used at the same time.

Further, in the method of preparing a catalyst according to the present disclosure, examples of the reducing agent used to reduce the metal precursors include, but are not limited to, chemical reducing agents and hydrogen. The reducing agent may be one or more selected from among sodium borohydride ($NaBH_4$), hydrazine ($N_2H_4$), sodium formate (HCOONa), ammonium hydrogen carbonate ($NH_4HCO_3$), and hydrogen ($H_2$), and, preferably, may be sodium borohydride ($NaBH_4$) or hydrogen ($H_2$).

In the present disclosure, in order to form a polymer electrolyte multilayer film containing metal particles on a carrier, another method may be used in addition to the above method. Therefore, still another aspect of the present disclosure provides a method of preparing a catalyst, including the steps of: (a) alternately applying a first polymer electrolyte solution and a second polymer electrolyte solution to a carrier to form a polymer electrolyte multilayer film on the carrier, wherein the first polymer electrolyte solution and the second polymer electrolyte solution are cationic or anionic electrolyte solutions different from each other, and at least one of the first polymer electrolyte solution and the second polymer electrolyte solution includes metal precursors complexed therewith; and (b) reducing the metal precursors dispersed in the polymer electrolyte multilayer film to metals using a reducing agent.

This method of preparing a catalyst can be performed in various manners according to the kind of electric charge of the carrier and the kind and order of the polymer electrolyte solutions or the polymer electrolyte solutions complexed with metal precursors. Examples of the various manners are as follows.

In the first manner, the catalyst is prepared by a process of forming a polymer electrolyte multilayer film containing metal particles on a carrier, including the steps of: (a) applying a cationic polymer electrolyte on an anionic resin having a sulfonic acid group ($SO_3^-$) using distilled water as a solvent to form a cationic polymer electrolyte layer; (b) applying an anionic polymer electrolyte complexed with metal ions on the cationic polymer electrolyte layer to form an anionic polymer electrolyte layer; (c) repeatedly laminating the cationic polymer electrolyte layer and the anionic polymer electrolyte layer to form a polymer electrolyte multilayer film; (d) immersing the polymer electrolyte multilayer film into a metal precursor solution to disperse metal ions in the polymer electrolyte multilayer film; and (e) reducing the metal ions dispersed in the polymer electrolyte multilayer film to metals using a reducing agent.

In the second manner, the catalyst is prepared by a process of forming a polymer electrolyte multilayer film containing metal particles on a carrier, including the steps of: (a) applying an anionic polymer electrolyte on a halogen-containing cationic resin ($NR_3^+Cl^-$) using distilled water as a solvent to form an anionic polymer electrolyte layer; (b) applying a cationic polymer electrolyte complexed with metal ions on the anionic polymer electrolyte layer to form a cationic polymer electrolyte layer; (c) repeatedly laminating the anionic polymer electrolyte layer and the cationic polymer electrolyte layer to form a polymer electrolyte multilayer film; (d) immersing the polymer electrolyte multilayer film into a metal precursor solution to disperse metal ions in the polymer electrolyte multilayer film; and (e) reducing the metal ions dispersed in the polymer electrolyte multilayer film to metals using a reducing agent.

The polymer electrolyte multilayer film formed by the method of the present disclosure is very physically and chemically stable because its respective layers are interconnected by electrostatic interaction, hydrogen bonding, van der Waals interaction or covalent bonding. The metals dispersed in the polymer electrolyte multilayer film are disposed in the form of encapsulation or embedment. Further, these metals are strongly connected with the polymer electrolyte multilayer film by electrostatic interaction, hydrogen bonding, van der Waals interaction or covalent bonding. Therefore, one of the problems of conventional catalysts supported with metal, that is, the problem that catalytic activity is deteriorated by the elution occurring during reactions, can be basically solved by the method of preparing a catalyst by dispersing metal particles in the polymer electrolyte polymer according to the present disclosure.

Further, still another aspect of the present disclosure provides a method of preparing hydrogen peroxide from hydrogen and oxygen using the catalyst under the condition that a reaction solvent does not include an acid promoter.

The production of hydrogen peroxide may be performed by a liquid phase reaction using methanol, ethanol or water as a solvent (reaction medium). Oxygen and hydrogen, serving as reactants, may be used in the form of a gas mixture diluted with nitrogen in order to prevent the danger of explosion. In this case, the reaction of oxygen and hydrogen to form hydrogen peroxide may be conducted using a tubular reactor provided with a cooling water jacket at a reaction pressure of 30~60 bar, preferably, 45~55 bar and a reaction temperature of 20~40° C., preferably, 20~30° C. while maintaining the volume ratio of hydrogen:oxygen:nitrogen at 3:40:57 and maintaining the supply ratio of the total amount of gas to the amount of solvent at about 3200.

In the reaction of producing hydrogen peroxide by the reaction of oxygen and hydrogen, only a very small amount of a halogen additive may be added without the addition of strong acid in order to prevent a reactor from being corroded. As the halogen additive, hydrobromic acid, sodium bromide (NaBr), potassium bromide (KBr) or the like may be used. The concentration of the halogen additive may be 1~100 ppm, preferably 5~50 ppm, more preferably 10~20 ppm, based on the amount of methanol used as a solvent.

Hereinafter, the present disclosure will be described in more detail with reference to the following Examples. Here, these examples are set forth to illustrate the present disclosure, but are not to be construed as the limit of the present disclosure.

In the following Examples, in order to compare the activity of catalysts used in the reaction of directly preparing hydrogen peroxide from oxygen and hydrogen, reaction times were set at 150 hours if not otherwise mentioned.

Example 1

Forming a Polymer Electrolyte Multilayer Film on an Anionic Carrier

A method of forming a polymer electrolyte multilayer film containing metal particles on an anionic resin having a sulfonic acid group ($SO_3^-$) was conducted as follows. All processes of the method were conducted at room temperature.

First, a 10 mM PAH (Poly(allyamine)hydrochloride, molecular weight 56,000) aqueous solution and a 10 mM PSS (Poly(4-styrenesulfonate), molecular weight 70,000) aqueous solution were prepared, and then the pH of each of the aqueous solutions was adjusted to 9 using hydrochloric acid and sodium hydroxide. $K_2PdCl_4$, serving a palladium precursor, was dissolved in distilled water to form a $K_2PdCl_4$ aqueous solution having a pH of 3.

10 g of an anionic resin having a sulfonic acid group ($SO_3^-$) was washed with 300 mL of distilled water for 10 minutes three times. The distilled water was removed, and then 300 mL of the 10 mM PAH aqueous solution was put into a beaker filled with the anionic resin having a sulfonic acid group ($SO_3^-$) and then stirred for 20 minutes. The solution remaining in the beaker was removed, and then the resulting product was further washed with 300 mL of distilled water for 5 minutes three times to form a PAH layer on the anionic resin.

The anionic resin including the PAH layer formed thereon was put into a beaker filled with 300 mL of the 10 mM PSS aqueous solution and then stirred for 20 minutes. The solution remaining in the beaker was removed, and then the resulting product was further washed with 300 mL of distilled water for 5 minutes three times. Thereafter, these processes were repeatedly performed to form a polymer electrolyte multilayer film having a layer number of 7.

The anionic resin including the polymer electrolyte multilayer film formed thereon was put into a beaker filled with 250 mL of the 1 mM $K_2PdCl_4$ aqueous solution and then stirred for 30 minutes. The solution remaining in the beaker was removed, and then the resulting product was further washed with 300 mL of distilled water for 5 minutes three times to disperse metal ions in the polymer electrolyte multilayer film formed on the anionic resin.

The anionic resin including the polymer electrolyte multilayer film dispersed with the metal ions was put into a beaker filled with 300 mL of distilled water and then stirred, and simultaneously 20 mL of a 50 mM $NaBH_4$ aqueous solution was dripped thereto to reduce the metal ions dispersed in the polymer electrolyte multilayer film. After the stirring was further performed for 30 minutes, the solution remaining in the beaker was removed, and then the resulting product was further washed with 300 mL of distilled water for 5 minutes three times, thereby preparing a catalyst. A method of producing hydrogen peroxide by the reaction of oxygen and hydrogen using the catalyst prepared through the above processes is conducted as follows.

10 cc of the catalyst was charged in a tubular reactor provided with a cooling water jacket, and was then washed with methanol for 3 hours at a reaction pressure of 1 bar and a reaction temperature of 25° C. Subsequently, methanol containing 15 ppm of HBr was used as a solvent instead of the methanol and the reaction temperature was increased to 50 bars, and then the reaction of producing hydrogen peroxide was conducted in a state in which the volume ratio of hydrogen:oxygen:nitrogen was maintained at 3:40:57 and the supply ratio of the total amount of gas to the amount of solvent was maintained at about 3200. After the reaction, the yield of hydrogen peroxide was calculated by titration, and the selectivity of hydrogen was analyzed by gas chromatography. The results thereof are given in Table 1.

Example 2 to 9

Forming Polymer Electrolyte Multilayer Films on Anionic Carriers

Polymer electrolyte multilayer films were formed in the same manner as Example 1 while changing the kinds of cationic/anionic polymer electrolytes, the pH of aqueous polymer electrolyte solutions and the layer number of the polymer electrolyte multilayer films. Further, methods of evaluating the activity of catalysts were conducted in the same manner as Example 1.

In these Examples, PAH (Poly(allyamine)hydrochloride, molecular weight 56,000), PDDA (Polydiallyldimethylammonium, molecular weight 100,000) and PEI (Poly(ethyleneimine), molecular weight 25,000) were used as the cationic polymer electrolytes, and PSS (Poly(4-styrenesulfonate), molecular weight 70,000) and PAA (Poly(acrylic)acid) were used as the anionic polymer electrolytes.

The preparation conditions and activity evaluation results of the catalysts are given in Table 1.

TABLE 1

| Ex. | Cationic polymer electrolyte | | | Anionic polymer electrolyte | | | Layer number of multi-layer film | Pd content (wt %) | $H_2O_2$ yield (wt %) | $H_2$ selectivity (%) |
| --- | --- | --- | --- | --- | --- | --- | --- | --- | --- | --- |
| | kind | conc. | pH | kind | conc. | pH | | | | |
| 1 | PAH | 10 mM | 9 | PSS | 10 mM | 9 | 7 | 0.29 | 8.0 | 71 |
| 2 | PAH | 10 mM | 9 | PSS | 10 mM | 9 | 5 | 0.21 | 6.8 | 70 |
| 3 | PAH | 10 mM | 9 | PSS | 10 mM | 9 | 9 | 0.35 | 8.5 | 68 |
| 4 | PDDA | 10 mM | 9 | PSS | 10 mM | 9 | 7 | 0.25 | 7.2 | 70 |
| 5 | PEI | 1 g/L | 5 | PSS | 10 mM | 9 | 7 | 0.30 | 5.8 | 63 |
| 6 | PEI | 1 g/L | 10 | PSS | 10 mM | 9 | 7 | 0.33 | 5.2 | 65 |
| 7 | PAH | 10 mM | 9 | PAA | 10 mM | 3.5 | 7 | 0.27 | 6.2 | 68 |
| 8 | PDDA | 10 mM | 9 | PAA | 10 mM | 3.5 | 7 | 0.10 | 2.8 | 68 |
| 9 | PEI | 1 g/L | 5 | PAA | 10 mM | 3.5 | 7 | 0.08 | 1.9 | 60 |

Example 10

Forming a Polymer Electrolyte Multilayer Film on a Cationic (Strongly Basic) Carrier A method of forming a polymer electrolyte multilayer film containing metal particles on a halogen-containing strongly basic cationic ($NR_3^+Cl^-$) resin was conducted as follows. All processes of the method were conducted at room temperature.

10 g of a halogen-containing strongly basic cationic ($NR_3^+$ $Cl^-$) resin was washed with 300 mL of distilled water for 10 minutes three times. The distilled water was removed, and then 300 mL of a 10 mM PSS aqueous solution was put into a beaker filled with the halogen-containing strongly basic cationic ($NR_3^+Cl^-$) resin and then stirred for 20 minutes. The solution remaining in the beaker was removed, and then the resulting product was further washed with 300 mL of distilled water for 5 minutes three times to form a PSS layer on the cationic resin.

The cationic resin including the PSS layer formed thereon was put into a beaker filled with 300 mL of a 10 mM PAH aqueous solution and then stirred for 20 minutes. The solution remaining in the beaker was removed, and then the resulting product was further washed with 300 mL of distilled water for 5 minutes three times. These processes were repeatedly performed to form a polymer electrolyte multilayer film having a layer number of 6.

Thereafter, a polymer electrolyte multilayer film dispersed with metal ions was formed on the halogen-containing strongly basic cationic ($NR_3^+Cl^-$) resin in the same manner as Example 1, thereby preparing a catalyst.

Hydrogen peroxide was produced by the reaction of oxygen and hydrogen using the catalyst in the same manner as Example 1.

Example 11 to 15

Forming Polymer Electrolyte Multilayer Films on Cationic (Strongly Basic) Carriers Polymer electrolyte multilayer films were formed in the same manner as Example 10 while changing the kinds of cationic/anionic polymer electrolytes, the pH of aqueous polymer electrolyte solutions and the layer number of the polymer electrolyte multilayer films. Further, methods of evaluating the activity of catalysts were conducted in the same manner as Example 1.

The preparation conditions and activity evaluation results of the catalysts are given in Table 2.

TABLE 2

| | Cationic polymer electrolyte | | | Anionic polymer electrolyte | | | Layer number of multi-layer film | Pd content (wt %) | $H_2O_2$ yield (wt %) | $H_2$ selectivity (%) |
|---|---|---|---|---|---|---|---|---|---|---|
| Ex. | kind | conc. | pH | kind | conc. | pH | | | | |
| 10 | PSS | 10 mM | 9 | PAH | 10 mM | 9 | 6 | 0.17 | 5.3 | 70 |
| 11 | PSS | 10 mM | 9 | PDDA | 10 mM | 9 | 6 | 0.21 | 5.5 | 69 |
| 12 | PSS | 10 mM | 9 | PEI | 1 g/L | 5 | 6 | 0.25 | 3.5 | 64 |
| 13 | PAA | 10 mM | 9 | PAH | 10 mM | 9 | 6 | 0.22 | 4.2 | 67 |
| 14 | PAA | 10 mM | 9 | PDDA | 10 mM | 9 | 6 | 0.10 | 2.0 | 67 |
| 15 | PAA | 10 mM | 9 | PEI | 1 g/L | 5 | 6 | 0.11 | 1.7 | 62 |

Example 16

Forming a Polymer Electrolyte Multilayer Film on a Cationic (Weakly Basic) Carrier A polymer electrolyte multilayer film was formed in the same manner as Example 10, except that an ammonia-containing weakly basic cationic resin was used as a carrier. Further, the evaluation of the activity of a catalyst was conducted in the same manner as Example 10. As a result, the prepared catalyst includes 0.2% of palladium, and, as the result of evaluating the activity of the catalyst, the yield of hydrogen peroxide is 5.4 wt %, and the selectivity of hydrogen is 68%.

Example 17 to 22

Forming Polymer Electrolyte Multilayer Films on Nonionic Carriers

Polymer electrolyte multilayer films containing metal particles were formed on inorganic alumina carriers. Methods of preparing a catalyst and methods of evaluating the activity of the catalyst were conducted in the same manner as Example 1, except for the kind of a carrier.

The preparation conditions and activity evaluation results of the catalysts are given in Table 3.

TABLE 3

| | Cationic polymer electrolyte | | | Anionic polymer electrolyte | | | Layer number of multi-layer film | Pd content (wt %) | $H_2O_2$ yield (wt %) | $H_2$ selectivity (%) |
|---|---|---|---|---|---|---|---|---|---|---|
| Ex. | kind | conc. | pH | kind | conc. | pH | | | | |
| 17 | PAH | 10 mM | 9 | PSS | 10 mM | 9 | 7 | 0.18 | 2.5 | 62 |
| 18 | PDDA | 10 mM | 9 | PSS | 10 mM | 9 | 7 | 0.17 | 2.5 | 64 |
| 19 | PEI | 1 g/L | 5 | PSS | 10 mM | 9 | 7 | 0.22 | 1.5 | 64 |
| 20 | PAH | 10 mM | 9 | PAA | 10 mM | 9 | 7 | 0.17 | 1.2 | 62 |
| 21 | PDDA | 10 mM | 9 | PAA | 10 mM | 9 | 7 | 0.12 | 1.1 | 62 |
| 22 | PEI | 1 g/L | 5 | PAA | 10 mM | 9 | 7 | 0.11 | 0.7 | 57 |

Example 23

Forming an Anionic Polymer Electrolyte Multilayer Film Complexed with Metal Precursors on an Anionic Carrier A polymer electrolyte multilayer film was formed on an anionic resin having a sulfonic acid group ($SO_3^-$) in the same manner as Example 1, except that an anionic polymer electrolyte (PSS-$Pd^{2+}$) complexed with metal was used. The anionic polymer electrolyte complexed with metal includes 10 mM PSS and 0.25 mM $K_2PdCl_4$ and has a pH of 5.

The anionic polymer electrolyte complexed with metal was repeatedly applied on the anionic resin to form a polymer electrolyte multilayer film having a layer number of 7, and then the polymer electrolyte multilayer film was reduced in the same manner as Example 1 without additionally introducing metal ions to form an anionic polymer electrolyte multilayer film complexed with metal particles on the anionic resin, thereby preparing a catalyst. The prepared catalyst includes 0.25 wt % of palladium (Pd).

Thereafter, the activity of the catalyst was evaluated in the same manner as Example 1. As a result, the yield of hydrogen peroxide is 6.9 wt %, and the selectivity of hydrogen is 70%.

Example 24

Forming a Cationic Polymer Electrolyte Multilayer Film Complexed with Metal Precursors on an Anionic Carrier A polymer electrolyte multilayer film was formed on an anionic resin having a sulfonic acid group ($SO_3^-$) in the same manner as Example 1, except that a cationic polymer electrolyte (PAH-$PdCl_4^{2-}$) complexed with metal was used. The cationic polymer electrolyte complexed with metal includes 10 mM PAH and 0.25 mM $K_2PdCl_4$ and has a pH of 5.

The cationic polymer electrolyte complexed with metal was repeatedly applied on the anionic resin to form a polymer electrolyte multilayer film having a layer number of 7, and then the polymer electrolyte multilayer film was reduced in the same manner as Example 1 without additionally introducing metal ions to form a cationic polymer electrolyte multilayer film complexed with metal particles on the anionic resin, thereby preparing a catalyst. The prepared catalyst includes 0.19 wt % of palladium (Pd).

Thereafter, the activity of the catalyst was evaluated in the same manner as Example 1. As a result, the yield of hydrogen peroxide is 5.8 wt %, and the selectivity of hydrogen is 69%.

Example 25

Forming an Anionic Polymer Electrolyte Multilayer Film Complexed with Metal Precursors on a Cationic Carrier A polymer electrolyte multilayer film was formed on a halogen-containing cationic ($NR_3^+Cl^-$) resin in the same manner as Example 10, except that an anionic polymer electrolyte (PSS-$Pd^{2+}$) complexed with metal was used. The anionic polymer electrolyte complexed with metal includes 10 mM PSS and 0.25 mM $K_2PdCl_4$ and has a Ph of 5.

The anionic polymer electrolyte complexed with metal was repeatedly applied on the cationic resin to form a polymer electrolyte multilayer film having a layer number of 6, and then the polymer electrolyte multilayer film was reduced in the same manner as Example 10 without additionally introducing metal ions to form an anionic polymer electrolyte multilayer film complexed with metal particles on the cationic resin, thereby preparing a catalyst. The prepared catalyst includes 0.18 wt % of palladium (Pd).

Thereafter, the activity of the catalyst was evaluated in the same manner as Example 10. As a result, the yield of hydrogen peroxide is 4.3 wt %, and the selectivity of hydrogen is 68%.

Example 26

Forming a Cationic Polymer Electrolyte Multilayer Film Complexed with Metal Precursors on a Cationic Carrier A polymer electrolyte multilayer film was formed on a halogen-containing cationic ($NR_3^+Cl^-$) resin in the same manner as Example 10, except that a cationic polymer electrolyte (PAH-$PdCl_4^{2-}$) complexed with metal was used. The cationic polymer electrolyte complexed with metal includes 10 mM PAH and 0.25 mM $K_2PdCl_4$ and has a pH of 5.

The cationic polymer electrolyte complexed with metal was repeatedly applied on the cationic resin to form a polymer electrolyte multilayer film having a layer number of 6, and then the polymer electrolyte multilayer film was reduced in the same manner as Example 10 without additionally introducing metal ions to form a cationic polymer electrolyte multilayer film complexed with metal particles on the cationic resin, thereby preparing a catalyst. The prepared catalyst includes 0.14 wt % of palladium (Pd).

Thereafter, the activity of the catalyst was evaluated in the same manner as Example 10. As a result, the yield of hydrogen peroxide is 2.4 wt %, and the selectivity of hydrogen is 65%.

Comparative Example 1

The activity of a commonly-used Pd/C catalyst composed of active carbon supported with 1 wt % of palladium (Pd) was evaluated in the same manner as Example 1. As a result, after 48 hours of reaction, the yield of hydrogen peroxide is 0.1 wt %, and the selectivity of hydrogen is 30%.

It can be seen from the result that the activity of the catalyst including a polymer electrolyte multilayer film of the present disclosure is higher than that of a catalyst including no polymer electrolyte.

Comparative Example 2

The activity of a catalyst including an anionic resin having a sulfonic acid group ($SO_3^-$) and doped thereon with 0.23 wt % of palladium (Pd) was evaluated in the same manner as Example 1. As a result, after 80 hours of reaction, the yield of hydrogen peroxide is 2.9 wt %, and the selectivity of hydrogen is 68%.

It can be seen from the result that the activity of the catalyst including the ionic resin formed thereon with a polymer electrolyte multilayer film of the present disclosure is higher than that of a catalyst including no polymer electrolyte layer.

Comparative Example 3

300 mL of an aqueous 10 mM PAH solution was put into a beaker filled with 10 g of an anionic resin having a sulfonic acid group ($SO_3^-$) and then stirred for 20 minutes. Subsequently, palladium ions were dispersed between the anionic resin and a cationic polymer electrolyte layer in the same manner as Example 1, and then the palladium ions were reduced to palladium metal using a reducing agent to prepare a catalyst. The prepared catalyst includes 0.12 wt % of palladium (Pd).

The activity of the catalyst was evaluated in the same manner as Example 1. As a result, after 80 hours of reaction, the yield of hydrogen peroxide is 1.4 wt %, and the selectivity of hydrogen is 67%.

It can be seen from the result that the activity of the catalyst including the ionic resin formed thereon with a polymer electrolyte multilayer film of the present disclosure is higher than that of a catalyst including only a single polymer electrolyte layer.

Comparative Example 4

300 mL of an aqueous 10 mM PAH solution was put into a beaker filled with 10 g of an inorganic alumina carrier and then stirred for 20 minutes. Subsequently, palladium ions were dispersed between the inorganic alumina carrier and a cationic polymer electrolyte layer in the same manner as Example 1, and then the palladium ions were reduced to palladium metal using a reducing agent to prepare a catalyst. The prepared catalyst includes 0.05 wt % of palladium (Pd).

The activity of the catalyst was evaluated in the same manner as Example 1. As a result, after 80 hours of reaction, the yield of hydrogen peroxide is 0.4 wt %, and the selectivity of hydrogen is 62%.

It can be seen from the result that the activity of the catalyst including the inorganic alumina carrier formed thereon with a polymer electrolyte multilayer film of the present disclosure is higher than that of a catalyst including only a single polymer electrolyte layer.

Comparative Example 5

300 mL of an aqueous 10 mM PSS solution was put into a beaker filled with 10 g of a nonionic inorganic alumina carrier and then stirred for 20 minutes. Subsequently, palladium ions were dispersed between the inorganic alumina carrier and an anionic polymer electrolyte layer in the same manner as Example 1, and then the palladium ions were reduced to palladium metal using a reducing agent to prepare a catalyst. The prepared catalyst includes 0.07 wt % of palladium (Pd).

The activity of the catalyst was evaluated in the same manner as Example 1. As a result, after 80 hours of reaction, the yield of hydrogen peroxide is 0.8 wt %, and the selectivity of hydrogen is 64%.

It can be seen from the result that the activity of the catalyst including the nonionic inorganic alumina carrier formed thereon with a polymer electrolyte multilayer film of the present disclosure is higher than that of a catalyst including only a single polymer electrolyte layer.

Although the various exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. An electrode-free catalyst for producing hydrogen peroxide from hydrogen and oxygen, consisting essentially of:
 a carrier made of anionic resin having a functional group selected among a sulfonic acid group, a carboxylic acid group, a phosphoric acid group and a phosphonic acid group;
 a polymer electrolyte multilayer film anchored on the carrier, in which cationic polymer electrolytes and anionic polymer electrolytes are alternately and repeatedly stacked on each other with a layer number of 2 to 30 to form the polymer electrolyte multilayer film, the cationic polymer electrolytes and the anionic polymer electrolytes each having a molecular weight of 2,000 to 500,000; and
 metal particles with an average size of 1 to 100 nm dispersed within the polymer electrolyte multilayer film, in which the metal particles are formed by dispersing metal precursors corresponding to the metal particles within the polymer electrolyte multilayer film and then reducing the dispersed metal precursors using a reducing agent, said metal particles selected from the group consisting of palladium (Pd), platinum (Pt), ruthenium (Ru), rhodium (Rh), iridium (Ir), silver (Ag), osmium (Os), nickel (Ni), copper (Cu), cobalt (Co), titanium (Ti), and mixtures thereof,
 said electrode-free catalyst exerting catalytic performance without electric potential.

2. The catalyst according to claim 1, wherein the cationic polymer electrolyte is at least one selected from the group consisting of poly(allylamine)hydrochloride, polydiallyldimethylammonium, poly(ethylenediamine) and poly(acrylamide-co-diallyldimethylammonium).

3. The catalyst according to claim 1, wherein the anionic polymer electrolyte is at least one selected from the group consisting of poly(4-styrenesulfonate), poly(acrylic acid), poly(acrylamide), poly(vinylphosphonic acid), poly(2-acrylamido-2-methyl-11-propanesulfonic acid), poly(anethole sulfonic acid) and poly(vinylsulfonate).

4. The catalyst according to claim 1, wherein the layer number is in the range of 2 to 15.

* * * * *